Figure 1:
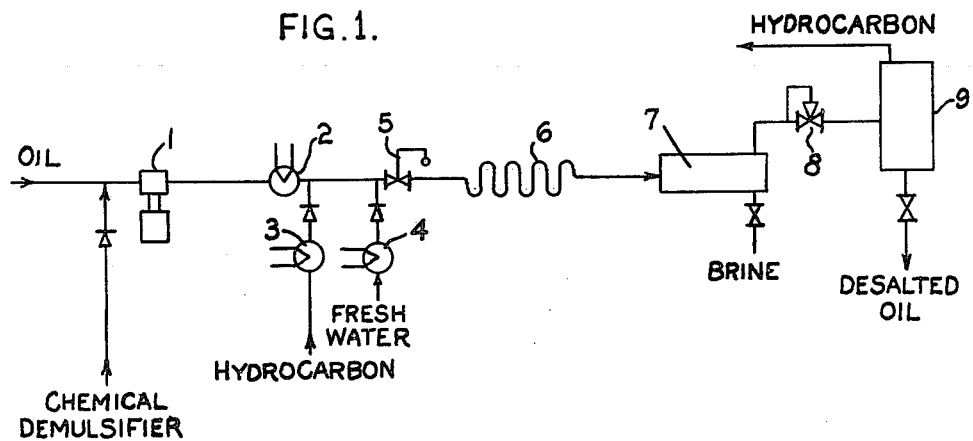

July 27, 1948. C. M. BLAIR, JR 2,446,040
PROCESS FOR DESALTING MINERAL OILS
Filed Nov. 29, 1946 2 Sheets-Sheet 1

INVENTOR,
CHARLES M. BLAIR JR.,
BY *Wells R. Church*
ATTORNEY.

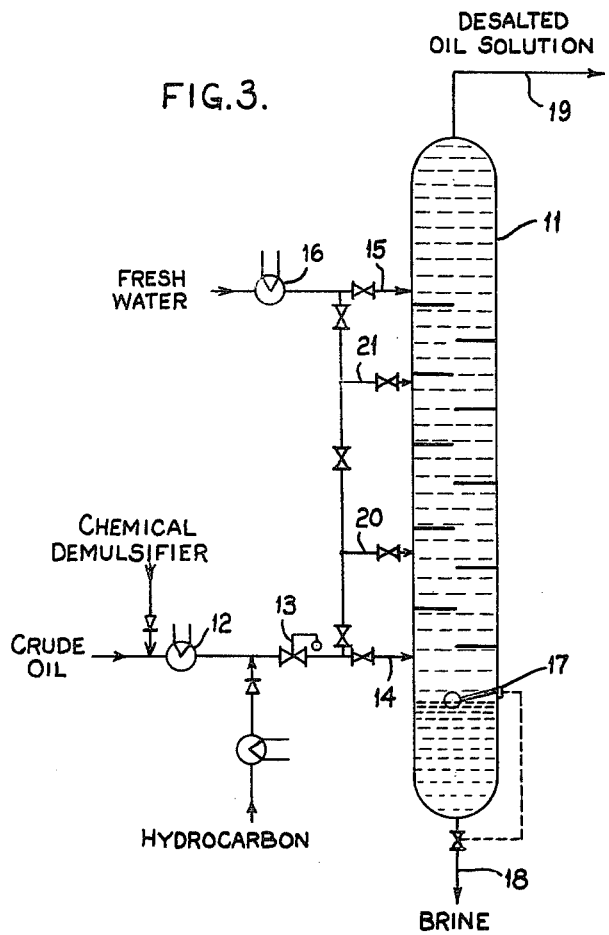

UNITED STATES PATENT OFFICE 2,446,040

PROCESSES FOR DESALTING MINERAL OILS

Charles M. Blair, Jr., Webster Groves, Mo., assignor to Petrolite Corporation, Ltd., Wilmington, Del., a corporation of Delaware Application November 29, 1946, Serial No. 713,061

3 Claims. (Cl. 252—327)

This invention relates to the removal of water-soluble impurities from petroleum oils, and has for its main object to provide a practicable process for removing such impurities, particularly dissolved inorganic salts, from petroleum, topped petroleum oils, crude fractions obtained by distillation, and extremely viscous petroleum oils which are not readily desalted by other methods.

The production of crude oil generally is accompanied by the production of naturally-occurring brines, and such brines are usually suspended or emulsified in the crude oil. In many cases such suspended brine will settle out rapidly on permitting the emulsion to stand quietly. In other cases, however, the brine is so thoroughly emulsified in the oil that a separation will not take place, even on prolonged standing. Such oil is commonly referred to as "cut oil," "roily oil," "emulsified oil," etc., and represents an emulsion of the water-in-oil type.

Before such oil becomes marketable, its content of emulsified water or brine must be reduced to a relatively low value. The upper limit for such water or brine content is usually 2%, but is more apt to be 1% or 0.5%, or slightly less. Such dehydrated oil is commonly referred to as "pipeline oil," since it meets the specifications set by the purchasing companies. The water per se present in the small amount of residual emulsion contained in the oil does not appear to be particularly objectionable in its effect on refining equipment or other equipment involved in its handling. However, in the great majority of cases, the residual emulsion contained in the pipeline oil does not consist of pure water, but is composed of an aqueous solution of inorganic salts, which was originally produced with the crude oil when it emerged from the ground. It has been found that such salts accompanying the oil are generally very objectionable to the refiner of the petroleum, and that it becomes extremely desirable to remove these impurities prior to further refining steps.

The presence of such inorganic salts in crude petroleum leads to two principal troubles, i. e., stoppage of flow or restriction of flow, and corrosion; and these combine to result in effects such as plugging of heat exchangers, decreased heat transfer, increased replacement costs, accelerated coke formation, lowered quality of products, lowered yields of valuable products and greater labor requirements.

Numerous attempts have been made to remove this residual salt, particularly that in the form of emulsified brine, from petroleum. On first sight, it might appear that this could be accomplished by applications of methods commonly employed for treatment of ordinary emulsified oil in the field. However, the conditions obtaining in the refinery where the salt removal operation is usually carried out, are generally different from those obtaining in the oil field where the emulsion, as originally produced, is dehydrated to the pipeline requirements. In the latter case, the emulsion may contain a larger percentage of dispersed water or brine; whereas, pipeline oil, considered as an emulsion, is apt to contain only a few tenths of a percent of water as the dispersed phase, and very seldom over 2%. In the average field, dehydration plant, the daily capacity is usually sufficiently small to permit very long settling times, perhaps as much as twenty-four hours or more; whereas, in the refinery the daily capacities are much higher and usually sufficient space is not available to permit much more than two hours settling time, and often one hour or less is the longest settling period available. Pipeline oil, as a rule, represents an aged emulsion which is usually weeks old and may be months or even years old. As a result, the dispersed particles in this emulsion are highly stabilized and difficult to resolve. Furthermore, these aged emulsion particles may have previously been subjected to the action of some demulsifying means when the oil was originally treated in the field, and having come through such treatment, may represent the more refractory and less resolvable portion of the original emulsion.

The removal of inorganic salts from pipeline oil, in other ways differs markedly from the ordinary field dehydration of cut oil or roily oil. In the latter case, the operation results in the conversion of a non-marketable material into a marketable one, and consequently, this operation will justify a relatively high cost. In removal of water-soluble impurities from the pipeline oil, the change brought about is one of degree, rather than of kind, and the justified expense is relatively small.

Since the water-soluble impurities contained in pipeline oil generally occur in the form of an aqueous solution in the remaining few tenths of a percent of emulsified water, it is clear then that the problem of the removal of these impurities can be solved, at least theoretically, by the removal of this remaining emulsified water. Numerous methods have been proposed and employed for effecting this removal. The simplest methods proposed have involved mechanical operations, such as sedimentation or filtration, or a combination of these; but such methods are generally unsatisfactory, due to the fact that the small amount of residual emulsion contained in the oil usually consists of extremely fine droplets, often less than $10^{-4}$ cm. in diameter; and as a result, the rate of sedimentation is extremely small, and the rate of coalescence to form droplets of larger size is also small. Filtration procedures usually result in rapid clogging of the filtering medium, involving frequent replacement and its attendant expense. Such methods have found very limited application in actual practice.

It appears to be extremely difficult to remove the last tenth of a percent or so of emulsified brine from a petroleum oil by any common means of demulsification, be it mechanical, electrical, or chemical. Yet, the amount of inorganic salts which can be carried by even 0.1% of emulsified brine may be much more than enough to cause serious difficulties during the refining process.

Mechanical procedures have also been proposed for use in connection with the introduction or dispersion of fresh water in the oil in predetermined amounts to act as a washing medium for removal of water-soluble impurities. However, on dispersing or mixing water with oil, it generally becomes emulsified, due to the presence of emulsifying agents commonly occurring in the oil, and the problem of removal of both the original emulsion particles and the added salt-free water arises. Here again, the rate of sedimentation of particles is generally too small to permit successful operation, and due to the protective action of the emulsifying agent in the pertoleum, coalescence of drops is prevented or reduced. Where a filtration procedure is employed, the filter rapidly becomes clogged with emulsion particles, which results in stoppage of the flow and necessitates careful attention and frequent replacement of the filtering medium.

One method which has been proposed and employed is to use an electrical dehydrator of the kind commonly employed in the resolution of emulsified oil to separate the prepared emulsion of predetermined water content, as previously described. In many instances, the adoption of the electrical dehydration process is eminently satisfactory, but it involves an added expense in the cost of an electrical dehydrator, and often requires the attention of a skilled operator to obtain uniformly successful results.

Another procedure which has been proposed, is to subject an emulsion or dispersion of a predetermined amount of fresh water in the pipeline oil to the action of a chemical demulsifier of the kind ordinarily used in resolution of roily oil or cut oil, followed by a settling period so as to permit sedimentation of the water particles. Such procedure, although it represents the simplest operative steps, in that no expensive apparatus must be prchased, and in that no skilled attention is required, still has proven unsatisfactory, in that little or no separation takes place within the limits of refinery economy. In other words, in the ordinary refinery practice, separation must take place relatively rapidly, usually within less than two hours, and often within less than one hour. This is true for various reasons, but there is one reason alone which is sufficient, in that, in order to obtain chemical demulsification, one usually must heat the oil; and in order to prevent the loss of heat, it is necessary that the oil be transferred to the furnace and fractionating still without delay. This is diametrically opposite to the practice which is employed in the oil fields. In oil field practice, emulsified oil may be heated to any desirable temperature, and may require twenty-four hours for separation. The fact that the heat units are lost during such long period, is absolutely immaterial, because the oil must be cooled in any event before it is marketable. For this reason, procedures which are satisfactory in oil field practice, fail utterly in desalting practice, for the reason indicated, i. e., inability to produce a rapid break.

In order to avoid heat losses, as has been previously pointed out, separation must be relatively fast in ordinary refinery practice. It also must be rapid for another reason, and that is, that space is not available, as a rule, to permit long periods of settling, such as are feasible and commonly used in oil-field practice concerned with the resolution of cut or roily oil. The importance of all this, of course, is appreciated to a greater degree when one realizes that the through-put of the average refinery is much greater than the through-put of an ordinary field treating plant.

These difficulties have now been overcome insofar as the desalting of many crude oils is concerned by the use of the processes described in my U. S. Patent No. 2,252,959, dated August 19, 1941, and U. S. Patent No. 2,310,673, dated February 9, 1943, which involve the addition of fresh water to the oil, followed by subjecting the mixture to a defined degree of agitation to bring about coalescence of the added water and original brine or salt particles.

While the desalting processes described in my before-mentioned patents are capable of efficiently desalting a wide variety of crude oils, reduced crude oils, or crude oil fractions, yet I have found that their application to some oils is difficult from a practical standpoint, or may require elaborate and expensive equipment. I have discovered oils which are particularly difficult to desalt by the previous processes are very viscous crude oils, reduced crudes and various petroleum fractions of high viscosity, particularly dark colored oils with viscosities substantially greater than four centistokes at 200° F. Apparently, due to the extremely high viscosity of such oils, their high content of emulsifying agents, or for other reasons, it is difficult or impossible to obtain satisfactory desalting results with such oils by previous methods.

It is the object of the present invention to overcome these difficulties existing in previous desalting processes and to provide a process for desalting viscous oils which have not been readily desalted by other means. I have found that such heavy oils may be desalted satisfactorily by a process which involves adding to such oils a diluent of low viscosity, in order to reduce the viscosity of the mixture and to bring about a change in physical properties of the system which permits ready resolution of emulsion formed during the process and makes possible a rapid and convenient sedimentation of original and added fresh water. In its simplest form the present process involves the following procedure:

(1) Addition of chemical demulsifier to the oil;

(2) Addition of a hydrocarbon diluent of low viscosity to the oil containing demulsifier;

(3) Thorough and uniform mixing of hydrocarbon diluent, oil and demulsifier;

(4) Addition of fresh water to the hydrocarbon system containing demulsifier, followed by dispersion of the added fresh water into the oil mixture;

(5) Provision of a period of gentle agitation sufficient to bring about coalescence of the added fresh water and original brine particles; and (6) Provision of a period of quiet settling sufficient to permit settling out of the coalesced brine and fresh water.

In some instances, the original heavy oil may contain no brine particles as such; especially in the case of reduced crudes, it may be found that the salt contained in the oil is present as a solid dispersed phase of salt crystals, or particles, since the original water associated with this salt may have been evaporated or distilled during the reduction of the crude. In such cases, the added fresh water contacts these solid salt particles during the coalescing stage and dissolves them to form a brine which is further coalesced through the action of the chemical demulsifier present in the system.

As will be seen by the more detailed description of this process which is given below, the order of addition or mixing of oil, low viscosity hydrocarbon, water and demulsifier is not particularly important. It is only necessary that these various ingredients be mixed with one another prior to or during the gentle agitation stage during which the actual desalting is brought about. If desired, the crude oil and low viscosity hydrocarbon diluent may be mixed prior to introduction of chemical demulsifier and fresh water. I have found that it is usually desirable but not necessary that the chemical demulsifier be present in the oil system prior to the addition of the fresh water. I have also found that it is usually desirable that the mixture of oil and hydrocarbon be heated somewhat prior to the introduction of the fresh water and that such fresh water should be heated approximately to the oil temperature before introduction into the oil system.

As usually carried out, the desalting process is applied to an oil in the refinery at a point just prior to the further distillation or cracking of the oil. Since the process of distillation or cracking involves heating of the oil to relatively high temperatures, it is usually convenient to introduce the desalting operation at such a point in the system, that the oil fluids are normally at an elevated temperature. The actual temperature at which the process is to be carried out may be varied over rather wide limits, but best results are usually obtained at the lowest cost within a temperature range of 100° F. to 400° F. The application of temperatures in the upper portion of this range are helpful, in that they bring about a reduction in the viscosity of the system, and therefore, increase the rate of sedimentation of water particles. However, the use of such high temperatures necessitates the installation of high pressure settling equipment and other apparatus required for handling of the oil or oil and water mixtures, and for this reason, may be less desirable from an economic standpoint.

Having thus described the essential features of the present invention in rather general terms, it appears that a further description involving the details of the process is in order. As pointed out above, the present process involves mixing with the heavy oil which is to be desalted, a low viscosity hydrocarbon diluent. Such diluent should be completely miscible, or nearly so, with the oil to which it is added. Examples of suitable diluents are kerosene, naphtha, gasoline, liquid propane, liquid butane, and other liquefied petroleum gases which might be readily available at the refinery. Liquefied gases having only one or two carbon atoms such as ethane and methane, will not in general be sufficiently miscible with the hydrocarbon oils to be of general interest. For practical and economic reasons, the most suitable diluent normally will be distillates obtained in the refining process to which the desalted oil is to be subjected, or other distillates normally available in an integrated petroleum refinery. Somewhat higher boiling distillates, such as gas oil, may in many cases be very satisfactory, and in general, any miscible hydrocarbon with a viscosity of less than four centistokes at 200° F. will be suitable. My preferred hydrocarbon diluent, however, is one boiling below about 400° F. and having a viscosity of less than two centistokes at 200° F. If convenient, a mixture of hydrocarbons may be used, rather than a single compound, but such mixture should have a viscosity of less than four centistokes at 200° F.

The amount of such hydrocarbon solvent required to be added to the oil, in carrying out my process, varies over rather wide limits and depends somewhat on the viscosity of the oil to be desalted and apparently on other factors which involve chemical, as well as physical, properties. Usually, the amount required for addition will range from about one-fourth the volume of the oil to be desalted to as much as four or five times the volume of the oil to be desalted. As a rough rule, with some exceptions, it has been found that the addition of sufficient solvent to give a final oil-solvent solution having a viscosity of four centistokes or less at 200° F. is satisfactory.

Among the preferred hydrocarbon diluents for use in the present process, compounds which have been found to give particularly satisfactory results, are the liquefied hydrocarbon gases having 3 or 4 carbon atoms, and in particular, liquid propane and liquid butane. These solvents have very low viscosities and permit the use of relatively low temperatures in a desalting process. Incidentally, the use of these solvents is sometimes convenient to the refiner, in that he may, in some instances, employ these very hydrocarbons for the deasphaltizing of crude oils or reduced crudes. At elevated temperatures, the solvent power of these liquid petroleum gases for asphaltic constituents in the oil are greatly reduced, and advantage can be taken of this fact to remove asphalt, asphaltenes, and related compounds from the oil. Where liquid propane, for example, is employed in the desalting process, the resulting solution of desalted oil in this solvent may be run directly to the deasphalting system, where the temperature is increased and the precipitated asphalt is separated. Where a deasphalting operating is being carried out, the introduction of a desalting step is advantageous, in that the quality of both oil and asphalt is improved. If desired, the desalting and deasphalting operations may be carried out simultaneously by employing a temperature sufficient to precipitate the asphalt phase and by providing mechanical means for separating the three resulting phases.

As previously mentioned, fresh water is added to the oil to be desalted or to the mixture of oil and low viscosity diluent. The point of addition of the water is not particularly important, as long as it is present during the subsequent gentle agitation stage, in which all the phases are present.

In the most general case, however, the fresh water will be added to the mixture of oil and diluent.

The water employed in my process should be as free from inorganic salts as possible. In actual practice, one must employ the most suitable water which happens to be available at the particular installation. In such circumstances, the fresh water may, in fact, carry minor or unobjectionable quantities of salts. There is no fixed rule as to the amount of water which shall be added, but generally speaking, it approximates 2% to 20% by volume of the oil being subjected to treatment. Factors which determine the amount of water are cost of water, ease of disposal, salt content of the crude to be treated, and loss of heat units in draw-off water, unless such heat units can be utilized in a suitable manner. It is unusual to obtain effective treatment with less than 2% of added water, and it is unusual to find circumstances which require more than 20% of added water.

The terms "fresh" water and "salt-free" water have been used throughout the previous discussion to describe the water added to the oil in my process, and it has been pointed out that as pure water as possible should be used in the process. However, in some instances, it may become necessary or desirable, for reasons of economy or convenience, to use a water of relatively high salt content, or a so-called brackish or hard water. In some instances, some of the water settling out in the settling vessel employed in the present process, may be mixed with fresh water, and this mixture then added to the oil entering the salt-removing system. In this case, part of the water used in the process is recycled. However, in all such cases as these where other than strictly fresh water is employed, the concentration in such water of these compounds which are to be removed from the oil must be lower than the concentration of these same constituents in the brine forming the dispersed phase in the pipeline oil. In other words, the water added in the process should contain less of the impurities to be removed from the oil than in the dispersed aqueous phase in the original oil. The terms "fresh" water and "salt-free" water, as used in the claims, will be intended to include such water as above described.

Where somewhat brackish or hard water is employed in the process, results usually will not be quite as good as where the same volume of strictly fresh water is used.

Having added the fresh water, the next step in my process is one of subjecting the mixture of water, oil and diluent to a period of gentle agitation. As is well known, agitation of two immiscible liquids tends to emulsify one within the other, and it is almost unpredictable that in the present process, gentle agitation generally leads to resolution of the original brine particles contained in the oil, accompanied by their coalescence with the added water, or leads to solution of any solid salt crystals in the added fresh water. In light of the fact that the effectiveness of the present process is highly dependent upon the employment of gentle agitation under conditions which are functionally sufficient, it is desirable to describe or define gentle agitation for the purpose of its employment in the present process.

Generally speaking, agitation of the proper kind can readily be obtained by turbulent flow through ordinary pipe and its attendant fittings. This avoids the use of additional expensive machinery or an especially prepared mixing device.

Furthermore, it often happens that such gentle agitation, by means of turbulent flow, can be obtained by proper arrangement of equipment normally used in refinery processing. In any event, such arrangement can usually be obtained at only slightly additional expense by some minor adaptation or conversion of available existing equipment. It is understood, however, that a person skilled in the art could employ any suitable means, device, or method which would give gentle agitation comparable or analogous in nature to that hereinafter described in detail. It is understood that the present invention is not limited to use of gentle agitation obtained only by turbulent flow through ordinary pipe and fittings, but that any equivalent procedure is suitable.

As is well understood, the character of flow in pipes is dependent upon several variables, such as size of pipe, velocity of flow, viscosity of the fluid, and density of the fluid. The nature of the flow may be characterized by a dimensionless constant, known as the "Reynolds number." This number for flow in any particular system, may be calculated from the variables which have just been mentioned, and it has been found by extensive experimentation, that when this figure is greater than about 2,100, the flow is turbulent, in contradistinction to streamline or viscous flow. Where fluids flow through constrictions or through pipe fittings, such as bends and turns, the Reynolds number characterizing the agitation at these points may be estimated from a consideration of the pressure drop through these constrictions or fittings and of the actual structural arrangements. For a discussion of the Reynolds number and methods of calculating the same, see "Principles of Chemical Engineering" by Walker, Lewis, McAdams and Gilliland, McGraw-Hill, 1937, page 60 et seq.

Obviously, if the flow becomes extremely turbulent, or if the pressure drop through the system becomes too abrupt, one no longer obtains the gentle agitation of the kind contemplated. Therefore, it has been found that the fluid flow, characterized by a Reynolds number larger than about 300,000, can no longer, for the purposes of the present invention, be considered as gentle agitation. When the Reynolds number exceeds this upper limit of about 300,000, one obtains violent agitation, with attendant shearing action, on dispersed water droplets.

Although it may be true that it is difficult to determine the Reynolds number with extreme accuracy when the value is considerably in excess of the upper limits previously mentioned, however, examination of many devices, such as emulsifying valves, orifice plates, etc., indicates a Reynolds number so high that even though it is determined only approximately, and even though the error in determination may be substantial, yet obviously, it is of a range far beyond the indicated maximum limit. Such agitation is unsuited for the step or stage prior to separation or settling. Thus, gentle agitation, as herein contemplated, is the kind characterized by a Reynolds number of 2,100 to 300,000 or its functional equivalent.

The length of the period of gentle agitation, as well as the degree of agitation, is also of great importance in my process. Employing a diluted oil, as described herein, satisfactory coalescence and desalting is obtained with some oils by applying agitation of the kind described for a period of thirty seconds or more. Usually, however, superior results are obtained by imposing the required agitation for 60 seconds or longer. In general, the application of a long period of agitation gives improved results, but for practical reasons, this period usually does not exceed about five to ten minutes.

Although in the most general application by the present process it is only necessary that the oil, diluent and fresh water be agitated gently, as heretofore described, in the presence of chemical demulsifier, it is sometimes desirable and beneficial, so far as the degree of salt removed is concerned, to disperse the added fresh water throughout the oil prior to the gentle agitation stage. Although such disposition of the added fresh water is not a necessary step in the present process, it is nevertheless a beneficial one in some instances. In such cases, the water should be dispersed to give particles having average diameters between about 3 mu and 200 mu. Reference to this size obviously does not apply to every dispersed droplet, but to the average of all of the droplets. The emulsion resulting from this type of dispersion and containing chemical demulsifier generally will be found to consist of two types of water particles, i. e., the original brine particles and fresh water particles which have not combined with the brine particles to any great degree.

Another important feature of my process is its application to desalting by means of a countercurrent treatment of crude oil and diluent with water. In this variety of process the oil and diluent-containing chemical demulsifier may be flowed countercurrently to a stream of fresh water in a vertical tower. The tower or other vessel used for such contacting should be so constructed as to give a zone of turbulent flow and consequent agitation of the upward flowing stream of water. Variations of this countercurrent desalting process will be obvious to the petroleum engineer. Instead of using a vertical tower for the contacting, one may mix oil, diluent and fresh water by means of passage through a pump or valve, followed by settling in a convenient size settler. The water settling from this first stage can then be pumped into the raw crude oil-diluent mixture at an earlier point in its flow and be re-used for initial desalting of this charge. The water settling from this operation may be further used, and so on, to obtain as many countercurrent desalting stages as may be desired. Usually, where a countercurrent process is employed, the period of gentle agitation of oil and water phases will be somewhat greater than in concurrent desalting, although not necessarily so.

As previously pointed out, the chemical demulsifier used in my process may be added either to the original viscous oil, to the mixture of oil and diluent, or to the mixture of oil, diluent, and water after the latter has been introduced but prior to the gentle agitation stage, or at least, before the completion of the gentle agitation stage. If desired, the demulsifier may even be added to the hydrocarbon diluent, or the water, since these are eventually mixed with the oil.

The selection of the proper demulsifying agent is best determined by an adaptation of the methods commonly employed in selecting a demulsifying agent for ordinary cut or roily oil. The same type of demulsifying agents employed in the resolution of roily oil are obviously suitable for this particular purpose, since the function of the reagent is the same, to wit, the resolution of a water-in-oil emulsion, in which the continuous phase is ordinary crude oil. The methods of selecting the most suitable demulsifier for cut oil or roily oil are well known and recorded in the literature. Broadly speaking, such conventional demulsifiers belong to various classes of organic chemical compounds, and particularly include petroleum sulfonates of the water-soluble and oil-soluble type; sulfonated resins; sulfoabietin; sulfonated amides; modified fatty acids obtained by the sulfonation or sulfation of fatty acids or fatty materials, followed by hydrolytic and polymerization steps; hydroxylated amides; Twitchell reagent type compounds; products obtained by oxidation or blowing of various oils, particularly selected vegetable oils; acylated or halogenated fatty bodies; quaternary ammonium compounds; alkyl-aryl sulfonic acid salts; derivatives of fatty materials, in combination with polybasic acids, such as oxalic acid or phthalic acid, and particularly, when further combined with various glycerols or amines; alkylated hydroaromatic bodies of the sulfo type; sulfonated amines; acylated cation-active compounds; materials akin to synthetic tanning agents, and derived by sulfonation of aromatic bodies and aldehydes or ketones; acylated diamines, etc. My preference is to use an oil-dispersible demulsifier, particularly one of the multiple type, i. e., one obtained by admixture of two different types of demulsifiers, rather than one consisting only of members of a single class or species.

In testing various demulsifiers, one naturally may add the demulsifier in suitable form to either the oil or to the fresh water prior to admixture, or one may add the demulsifier to the admixed conglomerate. In any event, however, one cannot test the demulsifier or make a comparison between various demulsifiers, unless the testing procedure includes a step of gentle agitation just prior to settling. In such experimentation one can use one of a number of various commercially available laboratory shaking or mixing machines of the kind which are adjustable so as to give different degrees of agitation.

In the accompanying drawings which form a part of this specification, various schematic arrangements which may be employed in carrying out my process are illustrated.

Figure 1 is a simplified, generalized plan. Chemical demulsifier is injected into the crude oil stream at the suction of the oil charge pump 1. The oil is heated in heat exchanger 2. The diluent hydrocarbon oil is heated by passing through exchanger 3 and is injected into the crude oil stream at any desired point. Fresh water is similarly heated in exchanger 4 and is injected into the oil-diluent mixture in the desired amount. The added fresh water is dispersed into the oil-diluent solution by passing the entire mixture through the weighted globe valve 5, or similar dispersing means. The mixture is then subjected to a period of agitation characterized by a Reynolds number within the range of 2100 to 300,000, or its functional equivalent. This agitation is carried out in apparatus 6 which may consist of a section of pipe of proper diameter and length, properly baffled pipe, a packed column or other suitable device of such size as to impart the desired turbulence for a period of at least 30 seconds, and preferably for 60 seconds or longer. The mixture finally passes, without being subjected to more intense turbulence than that provided in 6, to settler 7, wherein the coalesced water particles settle to the bottom to form a separate brine phase. Usually an interface between oil solution and brine is maintained within the settler, and brine is continuously withdrawn therefrom. Clean, desalted oil solution passes from the top of the settler through back pressure regulator 8, to still 9, where the lower boiling diluent hydrocarbon is removed for re-use, leaving the reduced, desalted crude oil as a bottoms product.

Figure 2:
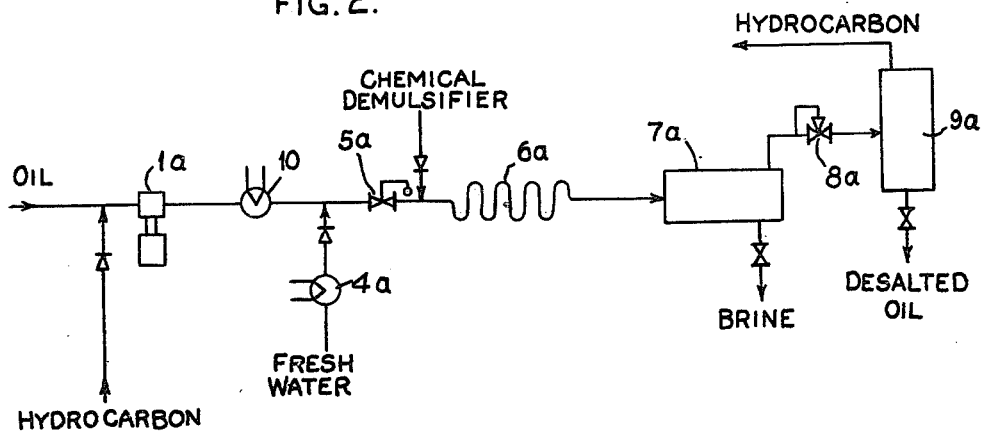

Figure 2 depicts a similar arrangement, in which the order of mixing of fluids is somewhat different from that of Figure 1. Hydrocarbon diluent is added to the oil at the suction of the charge pump 1ª. The solution is heated in heat exchanger 10, and fresh water, warmed in exchanger 4ª, is then pumped into the oil line. The water is dispersed throughout the oil by passage through weighted globe valve 5ª, which usually will be adjusted to give a pressure drop of from 10 to 75 p. s. i. Chemical demulsifier is then injected into the flow line, and thereafter, the mixture of fluids is subjected to the required degree and period of agitation by passage through a coil of pipe 6ª, of properly selected size. The mixture then passes to settler 7ª where the separated brine is removed. The desalted oil solution passes from the top of the settler through back pressure regulator 8ª to still 9ª, where the hydrocarbon diluent is removed by distillation, leaving desalted oil as the bottoms product.

Since an important feature of the present invention is the provision of a successful method of countercurrent extraction of salts from oil, Figure 3 is presented as an example of the simplest form of such system. This consists of a vertical tower 11, containing baffles, or packing, of sufficient size to insure turbulent flow therein. Crude oil containing chemical demulsifier is warmed in exchanger 12 and mixed with warm hydrocarbon diluent through valve 13. This mixture enters the vertical column 11 through line 14 and flows upwardly countercurrently to the fresh water which enters the column 11 through line 15 after being heated to the desired temperature, by passing through exchanger 16. A water level is maintained in the bottom of the column 11 by level controller 17, which actuates the brine draw-off valve to the disposal line 18. Sufficient height of column 11 above the water inlet point is provided to insure separation or sedimentation of water droplets from the desalted oil solution leaving the column through line 19. If desired, the top and/or bottom settling sections of the column 11, which are not involved in direct countercurrent flow, may be enlarged to provide longer periods of quiescent settling for the desalted oil solution phase and the brine phase. Alternative feed lines 20 and 21 are provided to allow variations in the length of countercurrent flow imposed.

In the case where an asphaltic oil or reduced crude is being desalted, and where a light hydrocarbon such as propane or butane is used as a diluent, one may, by operating at elevated temperature, obtain in the column a separation of three phases, i. e., asphalt containing diluent, brine, and desalted, deasphalted oil solution. In this case, provision should be made in the bottom of the column for drawing off separately the asphalt and brine layers. Where such a three phase separation is made, the present process has the particular advantage of accomplishing the desalting of both oil and asphalt.

When it is desired to perform such a simultaneous deasphalting and desalting operation, it is sometimes desirable to increase the proportion of diluent (propane) to oil above 5 to 1. Proportions as high as 10 or 15 to 1 may often be employed.

As specific examples of the results obtained by the present process, the following are presented:

Example 1

The oil to be desalted was a reduced Mid-Continent stock having the following properties:

A. P. I. gravity_____ 19.4 degrees
B. S. & W. content_____ Trace
Salt content (as NaCl)_____ 96.8 lbs. per 1000 bbls.
Viscosity at 200° F_____ 42.7 centistokes This oil was desalted in a system similar to that of Figure 1. A properly selected chemical demulsifier was added to the oil in the ratio of 1 part to 17,000 parts of oil. An equal volume of naphtha (boiling range about 320° to 380° F.) was added, the whole warmed to 180° F. and emulsified vigorously. This warm dispersion was then subjected to a 2-minute period of agitation characterized by a calculated Reynolds number of 144,000. The mixture was then allowed to settle quietly for 20 minutes, during which time the separated brine layer was removed, leaving an oil phase containing 0.2% B. S. & W. and chloride (as NaCl) equivalent to 8.6 pounds per 1000 bbls., based on the reduced crude. In this case, the mixture of reduced crude and naphtha had a viscosity of 2.0 centistokes at 200° F.

This particular reduced crude could not be desalted successfully by previously described processes, such as that described in my U. S. Patent No. 2,252,959.

Example 2

The oil to be desalted was a reduced Kansas crude oil having the following properties:

A. P. I. gravity_____ 16.6 degrees
B. S. & W. content_____ Trace
Salt content (as NaCl)___ 137.6 lbs. per 1000 bbls.
Viscosity at 200° F_____ 90.0 centistokes This oil was treated as in Example 1, except that chemical demulsifier was added in the proportion of 1 part to 12,500 parts of oil. The mixture of reduced crude oil and naphtha had a viscosity of 2.5 centistokes at 200° F.

The final desalted oil had a B. S. & W. content of 0.3% and a chloride content (as NaCl) of 8.8 pounds per 1,000 barrels.

Again, this reduced crude was one which could not be satisfactorily desalted by previous methods.

Having thus described my invention, what I claim as new and desire to secure by Letters Patent is:

1. A process for treating petroleum oils to reduce the inorganic salt content thereof, characterized by diluting the oil with a hydrocarbon solvent having a viscosity of less than 4 centistokes at 200° F., continuously and countercurrently contacting such mixture with fresh water in a unitary contacting zone, wherein the counterflowing phases are subjected to a period of gentle agitation, characterized by a Reynolds number of between 2100 and 300,000 for a period of from 1 to 10 minutes, incorporating a chemical demulsifier in one of the counterflowing phases prior to the period of gentle agitation, continuously withdrawing a desalted oil solution from one end of said zone and continuously withdrawing an aqueous phase from the other end of said zone; said fresh water being fed continuously to said contacting zone in the proportion of from 2% to 20% of the volume of the petroleum oil.

2. A process for treating petroleum oils to reduce the inorganic salt content thereof, characterized by diluting the oil with a liquefied petroleum gas having more than 2 carbon atoms, maintaining sufficient pressure on such mixture to prevent vaporization, continuously and countercurrently contacting such mixture with fresh water in a unitary contacting zone, wherein the counterflowing phases are subjected to a period of gentle agitation, characterized by a Reynolds number between 2100 and 300,000 for a period of from 1 to 10 minutes, incorporating a chemical demulsifier in one of the counterflowing phases prior to the period of gentle agitation, continuously withdrawing a solution of desalted oil from one end of said zone, and continuously withdrawing an aqueous phase from the other end of said zone; said fresh water being fed continuously to said zone in the proportion of from 2% to 20% of the volume of the petroleum oil.

3. A process for treating petroleum oils to reduce the inorganic salt content thereof, characterized by diluting the oil with liquid propane, maintaining sufficient pressure on said mixture to prevent vaporization, continuously and countercurrently contacting such mixture with fresh water in a unitary contacting zone, wherein the counterflowing phases are subjected to a period of gentle agitation, characterized by a Reynolds number between 2100 and 300,000 for a period of from 1 to 10 minutes, incorporating a chemical demulsifier in one of the counterflowing phases prior to the period of gentle agitation, maintaining a temperature within the contacting zone sufficiently high to cause separation of a propane-lean asphaltic phase, continuously withdrawing a propane rich solution of desalted, deasphalted oil from one end of said zone, and continuously and separately withdrawing an aqueous phase and a desalted propane-lean asphaltic phase from the other end of said zone; said fresh water being fed continuously to said zone in the proportion of from 2% to 20% of the volume of the petroleum oil.

CHARLES M. BLAIR, Jr.

REFERENCES CITED

The following references are of record in the file of this patent:

UNITED STATES PATENTS

| Number | Name | Date |
|---|---|---|
| 1,617,739 | Averill | Feb. 15, 1927 |
| 2,195,833 | Wirth | Apr. 2, 1940 |
| 2,235,639 | Koch | Mar. 18, 1941 |
| 2,252,959 | Blair | Aug. 19, 1941 |
| 2,310,673 | Blair | Feb. 9, 1943 |
| 2,366,792 | Kirkbride | Jan. 9, 1945 |
| 2,383,535 | Dickinson et al. | Aug. 28, 1945 |
| 2,410,970 | Guyer | Nov. 12 1946 |